United States Patent [19]

Sakamoto

[11] Patent Number: 4,983,867
[45] Date of Patent: Jan. 8, 1991

[54] HYBRID-TYPE STEPPING MOTOR
[75] Inventor: Masafumi Sakamoto, Kiryu, Japan
[73] Assignee: Japan Servo Co., Ltd., Tokyo, Japan
[21] Appl. No.: 544,902
[22] Filed: Jun. 28, 1990
[51] Int. Cl.$^5$ .............................................. H02K 37/00
[52] U.S. Cl. ................................... 310/49 R; 310/185; 310/269; 310/179
[58] Field of Search ...................... 310/49 R, 156, 179, 310/180, 184, 185, 269, 162, 163, 164

[56] References Cited

U.S. PATENT DOCUMENTS

| | | | |
|---|---|---|---|
| 3,949,253 | 4/1976 | Broadway et al. | 310/184 |
| 4,021,015 | 5/1977 | Maeder et al. | 310/162 |
| 4,081,703 | 3/1978 | Madsen et al. | 310/49 R |
| 4,385,247 | 5/1983 | Satomi | 310/49 R |
| 4,675,564 | 6/1987 | Isozaki | 310/49 R |
| 4,733,113 | 3/1988 | Smith | 310/49 R |
| 4,739,201 | 4/1988 | Brigham et al. | 310/49 R |
| 4,758,752 | 7/1988 | Leenhouts | 310/49 R |
| 4,910,475 | 3/1990 | Lin | 310/49 R |
| 4,947,066 | 8/1990 | Ghibu et al. | 310/269 |

OTHER PUBLICATIONS

Proceedings Sixth Annual Symposium: Incremental Motion Control Systems and Devices, May 24–27, 1977, England, pp. 331–342, G. I. Biscoe et al., "The Rationalisation and Standardization of Stepping Motors and Their Test Methods".

Primary Examiner—Steven L. Stephan
Assistant Examiner—Edward To
Attorney, Agent, or Firm—Oblon, Spivak, McClelland, Maier & Neustadt

[57] ABSTRACT

A stepping motor includes a stator having a plurality of magnetic poles wound with windings of three phases or four phases, and a rotor formed by a pair of rotary plates each having a multiplicity of gear-like salient poles and an axially magnetized permanent magnet sandwiched between the rotary plates. Where the number of magnetic poles of the stator is represented by m, the number of gear-like salient poles of the rotary plate is Z, and n is an integer equal to or larger than 1, in order to obtain a minute step angle, m, n and Z are selected to satisfy the following relationship: when $m=9$, and a 3-phase winding stator, $Z=9n\pm 3$.

8 Claims, 7 Drawing Sheets

FIG. 5

|   | I | II | III |
|---|---|----|-----|
| 1 | + |    |     |
| 2 |   | −  |     |
| 3 |   |    | +   |
| 4 | − |    |     |
| 5 |   | +  |     |
| 6 |   |    | −   |
| 7 | + |    |     |

FIG. 6

|   | I | II | III |
|---|---|----|-----|
| 1 | + | −  |     |
| 2 |   | −  | +   |
| 3 | − |    | +   |
| 4 | − | +  |     |
| 5 |   | +  | −   |
| 6 | + |    | −   |
| 7 | + | −  |     |

FIG. 8A

| n | 9n + 3 | | 9n − 3 | |
|---|---|---|---|---|
| | Z | θs | Z | θs |
| 2 | 21 | 2.857° | 15 | 4.0° |
| 3 | 30 | 2.0° | 24 | 2.5° |
| 7 | 66 | 0.909° | 60 | 1.0° |
| 8 | 75 | 0.8° | 69 | 0.869° |
| 13 | 120 | 0.5° | 114 | 0.526° |
| 17 | 156 | 0.384° | 150 | 0.4° |
| 27 | 246 | 0.243° | 240 | 0.25° |

FIG. 8B

| n | 12n + 4 | | 12n − 4 | |
|---|---|---|---|---|
| | Z | θs | Z | θs |
| 2 | 28 | 2.142° | 20 | 3° |
| 6 | 76 | 0.789° | 68 | 0.882° |
| 8 | 100 | 0.6° | 92 | 0.652° |
| 12 | 148 | 0.405° | 140 | 0.428° |
| 17 | 208 | 0.288° | 200 | 0.3° |

FIG. 8C

| n | 8n + 3 | | 8n − 3 | |
|---|---|---|---|---|
| | Z | θs | Z | θs |
| 2 | 19 | 2.368° | 13 | 3.461° |
| 4 | 35 | 1.285° | 29 | 1.551° |
| 6 | 51 | 0.882° | 45 | 1.0° |
| 8 | 67 | 0.671° | 61 | 0.737° |
| 10 | 83 | 0.542° | 77 | 0.584° |

FIG. 8D

| n | 16n + 6 | | 16n − 6 | |
|---|---|---|---|---|
| | Z | θs | Z | θs |
| 2 | 38 | 1.184° | 26 | 1.730° |
| 4 | 70 | 0.642° | 58 | 0.775° |
| 6 | 102 | 0.441° | 90 | 0.5° |
| 8 | 134 | 0.335° | 122 | 0.368° |
| 10 | 166 | 0.271° | 154 | 0.292° |

HYBRID-TYPE STEPPING MOTOR

BACKGROUND OF THE INVENTION

1. Field of the Invention

The present invention relates to a hybrid-type stepping motor applicable to three phases and four phases.

2. Description of the Prior Art

As prior art hybrid-type stepping motors, most of the motors are of 2-phase type, and it is structured as shown in FIGS. 1A and 1B.

In FIGS. 1A and 1B, the reference numeral 1 designates a stator housing, 2 designates a stator core and it constitutes magnetic poles 2a to 2h.

The reference numeral 21 designates pole teeth formed in an inner periphery of each magnetic pole.

The reference numeral 3 designates stator windings, and each winding is wound about each magnetic pole as designated by numeral 3a to 3h.

These stator core 2 and the stator windings 3 constitute a stator S.

The reference numerals 4 and 4' designate end brackets, and 5 and 5' designate bearings.

The reference numeral 6 designates a rotor shaft, 7 and 8 respectively designate rotor magnetic poles, 7a and 8a respectively designate pole teeth formed in outer peripheries of the rotor magnetic poles 7 and 8, numeral 9 designates a permanent magnet, and a rotor R is constituted by these members 6 to 9.

Here, among the indexes representing the performances of a stepping motor, there is a step angle $\theta_s$ as an important index.

Normally, the step angle $\theta_s$ is determined by the number of phases P of the stator windings and the number of pole teeth formed in the rotor magnetic pole, and it is expressed by the following equation.

$$\theta_s = 180/PZ \text{(degrees)} \quad \ldots \quad (1)$$

Here, P is the number of phases of the stator windings, and Z is the number of pole teeth formed in one magnetic pole.

The step angle $\theta_s$ shown in equation (1) is an angle obtained in the case of one phase excitation in which the windings of one phase are sequentially energized, or two phase excitation in which the windings of two phases are sequentially energized, and it is inherent in the stepping motor.

When the step angle $\theta_s$ is made small, a stepping motor having a high resolution is obtained, and it is possible to improve the control performance. Thus, there are various working examples.

The equation (1) indicates that when the number of phases P and the number of pole teeth Z in the denominator are increased $\theta_s$ becomes small.

The step angle of a prior art 2-phase permanent magnet type stepping motor is represented by:

$$\theta_s = 180/2Z,$$

and in order to make it a minute angle, Z is required to be large, that is, to make a rotor tooth width small. However, to achieve this, there has been a limitation due to restriction in the machining technique.

On the other hand, it may be considered to increase the number of phases P to 5 (five) phases. However, in this case, there has been a problem in which the number of switches in a driving circuit is increased, and the circuit becomes complicated and expensive.

SUMMARY OF THE INVENTION

It is an object of the present invention to provide a hybrid-type stepping motor which is designed to solve the above problems in the prior art.

A hybrid-type stepping motor in accordance with the present invention is arranged to satisfy the following conditions a to c:

a. The number of phases of the windings of the stator is made 3, or 4.

b. The rotor is formed by 2 (two) rotary plates having a multiplicity of gear-like salient poles, and a permanent magnet sandwiched between the rotary plates and magnetized in the same direction as a rotary shaft. The two gear-like salient poles which sandwiches the permanent magnet are disposed with a half salient pole pitch displaced relative to each other when viewed in the direction of the rotary shaft.

c. In an inner rotor, hybrid type stepping motor wherein m stator magnetic poles are disposed radially at equal pitches over 360 degrees, and each of its opposing portions to the rotor has a plurality of teeth the same in number and having a pitch substantially equal to a rotor tooth pitch, and each main pole is wound with a winding, when the number of gear-like salient poles of the rotor is represented by Z, and n is an integer equal to or larger than $1(n \geq 1)$, the following relationships are satisfied: 1) when m=9, and the stator is a 3-phase winding stator, it is set that $Z = 9n \pm 3$, 2) when m=12, and the stator is a 3-phase winding stator, it is set that $Z = 12n \pm 4$, 3) when m=8, and the stator is a 4-phase winding stator, it is set that $Z = 8n \pm 3$, 4) when m=16, and the stator is a 4-phase winding stator, it is set that $Z = 16n \pm 6$, and 5) the above-mentioned items 1) to 4) are applied to an outer rotor, hybrid-type stepping motor in which a rotor is rotated at the outer side of a stator.

BRIEF DESCRIPTION OF THE DRAWINGS

FIGS. 1A and 1B shows a prior art example in which FIG. 1A is a longitudinal sectional front view, and FIG. 1B is a sectional view taken along the line X—X in FIG. 1A.

FIG. 5 is a current supply sequence diagram applicable to the case of FIGS. 4A to 4G.

FIG. 6 is a current supply sequence diagram in 2-phase excitation of a stepping motor according to the present invention.

FIGS. 8A to 8D show Tables in which FIG. 8A shows an actual example of a relationship between a 3-phase, 9 pole stator and the number of rotor teeth in the present invention;

FIG. 8B shows an actual example of a relationship between a 3-phase, 12 pole stator and the number of rotor teeth in the present invention;

FIG. 8C shows an actual example of a relationship between a 4-phase, 8 pole stator and the number of rotor teeth in the present invention; and FIG. 8D shows an actual example of a relationship between a 4-phase, 16 pole stator and the number of rotor teeth in the present invention.

DESCRIPTION OF THE PREFERRED EMBODIMENTS

The present invention will be described concretely based on an embodiment shown in FIG. 2. As the embodiment of the invention, it will be described in the case of 3 phases.

Figure 1A:
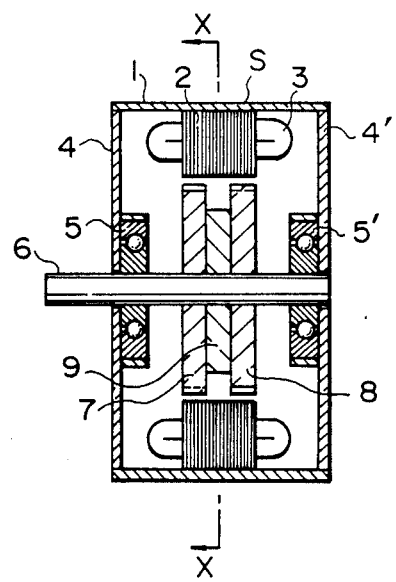
Figure 1B:
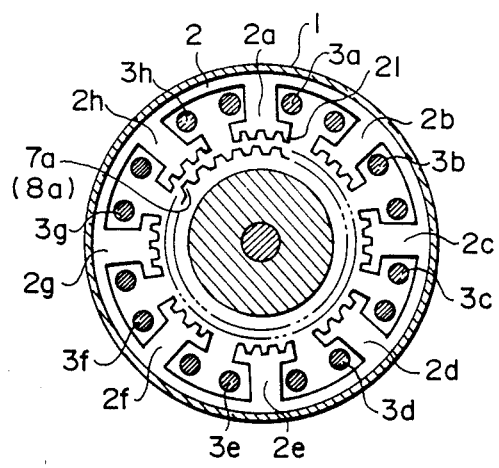
Figure 2:
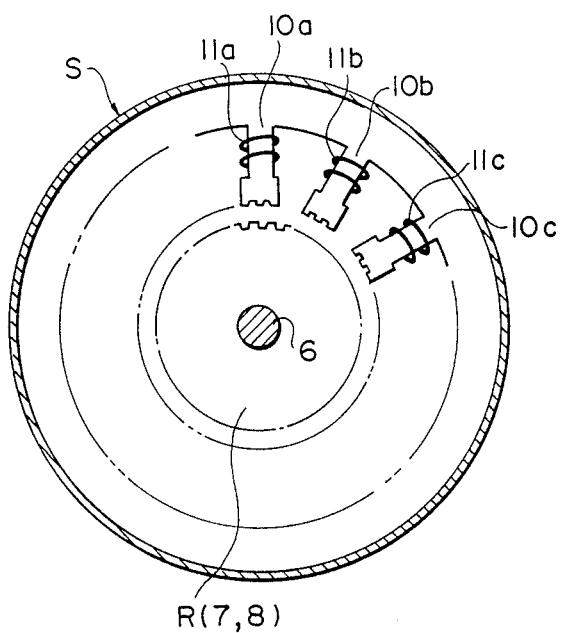
FIG. 2 is a cross sectional side view showing an embodiment of the present invention.

In FIG. 2, equivalent parts are designated by equivalent reference numerals as used in FIG. 1.

A rotor R of a stepping mortor in the present invention, similar to the rotor R of the 2-phase stepping motor in the prior art example, a permanent magnet 9 is disposed between rotor magnetic poles 7 and 8 to be sandwiched therebetween, and also, pole teeth are formed in each magnetic pole. However, the illustration in the drawings are omitted. The setting of the number of teeth Z of the pole teeth of one rotor magnetic pole will be described later.

Furthermore, in a stator S of the stepping motor in the present invention, a stator magnetic pole 10a is wound with a winding 11a of a first phase, and a stator magnetic pole 10b is wound with a winding 11b of a second phase, and further, a stator magnetic pole 10c is wound with a winding 11c of a third phase, and so on. The fourth phase is not shown, however, another stator pole 10d may be disposed next to the stator pole 10c with a pitch equal to the pitches between the stator poles 10a, 10b and 10c, and a winding 11d corresponds to the fourth phase. When the number of stator magnetic poles is represented by m, in the present invention, in the case of 3-phase winding, m is limited to 9 or 12, and in the case of 4-phase winding, m is set to 8 or 16.

Generally, in a hybrid type stepping motor, when a value of m is increased, a detent torque or cogging torque which is the torque produced when no current flows can be reduced. When this torque is small, generally, the non-uniformity in a step angle $\theta_s$ becomes small, and a high positioning accuracy can be achieved. On the other hand, when m is large, the cost at the time of winding work increases. Accordingly, practically, the number of stator magnetic poles m is selected between 8 to 16 for general purposes in view of the performance and economy. When m=9, since it is 3-phase winding, the number of stator magnetic poles per one phase is 3, and the three magnetic poles are arranged at equal intervals of 120 degrees. When m=12, the number of stator magnetic poles per one phase is 4, and the four magnetic poles are arranged at equal intervals of 90 degrees.

In the case of 3 phases, relationships between the number of stator magnetic poles m and the number of teeth of the rotor Z in the present invention are shown as follows.

When $m = 9, Z = 9n + 3,$ (2)

$Z = 9n - 3$ (3)

When $m = 12, Z = 12n + 4,$ (4)

-continued $Z = 12n - 4$ (5)

where n is an integer equal to or larger than 1 (n=1).

The values of Z obtained from equations (2) to (5) by varying the value of n are shown in FIGS. 8A and 8B.

For example, in equation (4), when n=8, then Z=100, and it is obtained a step angle $\theta_s$=0.6 degrees, by equation (1).

Now, the above results will be compared with a prior art 2-phase hybrid stepping motor.

In the 2-phase motor, when Z=100, from equation (1), it is obtained that $\theta_s$=(180)/(2×100)=0.9 degrees. In other words, when the size of the rotor is the same, the step angle becomes a minute angle by 33% in the case of the 3-phase motor.

Conversely, in the case of the 2-phase motor, when it is designed to obtain a step angle of 0.6 degrees, it will result in that Z=150.

In a 3-phase motor, when a step angle of 0.6 degrees is to be designed with Z=100, and with a rotor outer diameter of 22 mm, a tooth pitch becomes $22\pi/100$=0.69 mm, and a tooth width is assumed to be about 50% of the pitch and thus it is 0.35 mm. Since a silicon steel plate having a thickness of 0.35 mm is available commercially, and since the tooth width is equal to the iron plate thickness, it becomes possible to use press punching.

In the case of an inner rotor type, when a rotor diameter is 22 mm, a motor outer diameter is about 40 mm, and a step angle of 0.6 degrees can be realized by the size mentioned above. Any magnitude of step angle of a stepping motor is not always obtained by arbitrarily selecting a value of Z in equation (1). Furthermore, when all the stator magnetic poles whose number is m are disposed at equal pitches, a value of Z which is selectable is further limited. As shown in FIGS. 8A and 8B, in accordance with the present invention, it will be appreciated that practical step angles are obtained by arranging m at equal pitches.

The step angle is obtained in the following manner. For example, in FIG. 8B, when Z=12n+4, and n=6, by substituting P=3, and Z=76 in equation (1), $\theta_s$=0.7894 is obtained. Although this value is not exactly divisable, a stepping motor is operating by dividing 360 degrees by 2PZ equally, that is, by 456 equally. Accordingly, there is no problem in the accuracy of the step angle. However, as a user, it is facilitated in use when $\theta_s$ is a value exactly divided, for example, when Z=12n+4 and n=8, it is obtained that =0.6 degrees.

From this point of view, when m=9, in FIG. 8A, there are many step angles such as 4.0°, 2.5°, 2.0°, 1.0°, 0.8°, 0.5°, 0.4°, and 0.25° which are easy to use, and thus it is superior in this respect. Further, in FIG. 8A, when Z=9n−3 and n=27, that is, when Z=240, it is obtained that $\theta_s$=0.25°. When the number of rotor teeth becomes 250, in the case of an inner rotor type, and when a rotor pitch is 0.69, a rotor diameter becomes about 55 mm, and a motor outer diameter becomes about 100 mm.

The present invention is applicable also to a so-called outer rotor type. In this case, in contrast to the inner rotor type in which the rotor is formed by rotary plates having gear-like salient poles, it is only required to arrange two internal gear like rotors which sandwiches a ring like permanent magnet therebetween so that the two rotors are displaced by ½ pitch relative each other, and to dispose a ball bearing or like at the center of a stator for supporting a rotary shaft. In the stator, it is only necessary that m magnetic poles extend radially and outwardly so that the magnetic poles oppose the internal gear like portions of the rotor with an air gap interposed therebetween. When this outer rotor type is employed, this 0.25° step angle motor is realized with a motor outer diameter of about 60 mm when a tooth pitch is the same, that is, 0.69 mm. In the outer rotor type stepping motor, since the inertia of the rotor becomes large, it is not suitable for use in which start and stop operations are frequently repeated. On the hand, the outer rotor type is advantageous in such a use in which it is driven at a constant rotational speed to reduce non-uniform rotation, for example, when a drum of a laser beam printer is directly driven by the stepping motor, since the inertia is larger, the non-uniform rotation is recuded and an available driving torque is relatively large. At the present time, as a motor for such a use, an outer rotor type brushless DC motor is used. In this case, as an outer rotor, since a permanent magnet is magnetized as it is, and since a stator has no teeth, the number of rotations can not be reduced, and usually, a mechanical decelerating member like gear train is used additionally. The aging of the decelerating member some times cause the non-uniform rotation, and a motor which can be driven directly without the decelerating member is needed. To this requirement, the outer rotor type stepping motor is considered to be most suitable.

Next, in the case of 4-phase type, the following equations indicate relationships between the number of stator magnetic poles m and Z according to the present invention.

$$\text{When } m = 8, Z = 8n + 3, \tag{6}$$

$$Z = 8n - 3 \tag{7}$$

$$\text{When } m = 16, Z = 16n + 4, \tag{8}$$

$$Z = 16n - 6 \tag{9}$$

Examples of Z obtained from the above equation (6) to (9) when n is changed are shown in FIGS. 8C and 8D. In the case of 4-phase, it is actually more advantageous to obtain a minute angle than 3-phase. As will be seen from equation (1), as compared with a 2-phase motor, the step angle can be made ½ with the same number of teeth. On the other hand, as an output stage portion of a driving circuit for 4-phase, two output stage portions for 2-phase may be used, and it is not so complicated as compared with 5-phase.

The stepping motor of the present invention can rotate with a minute step angle $\theta_s$ determined by a permanent magnet type rotor having the number of teeth Z which satisfies the relationships mentioned above, and by a stator iron core having, in the case of 3-phase, 9 poles or 12 poles, and in the case of 4-phase, 8 poles or 16 poles uniformly distributed.

Figure 3:
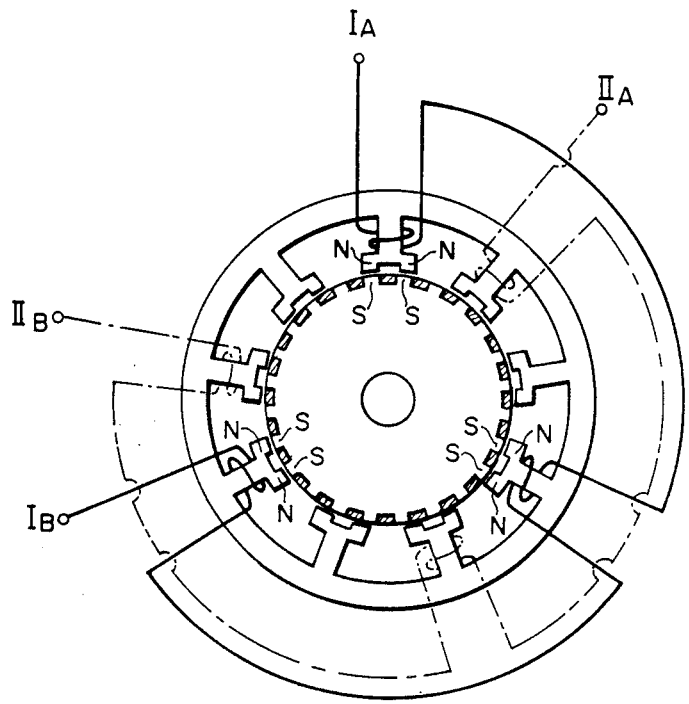
FIG. 3 is a cross sectional side view showing an example of a stepping motor according to the present invention wherein a 3-phase stepping motor has 9 stator poles, and 24 rotor teeth.
Figure 4A:
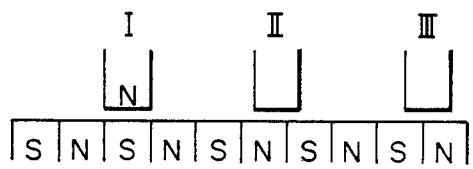
FIGS. 4A to 4G are diagrams showing the principles of rotation by 1-phase excitation of a stepping motor according to the present invention.
Figure 4B:
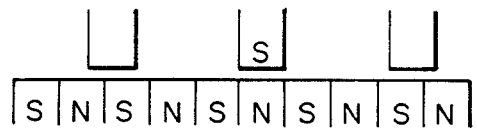
Figure 4C:
Figure 4D:
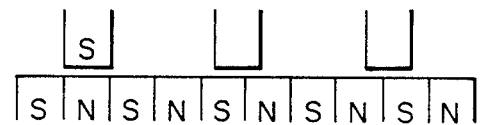
Figure 4E:
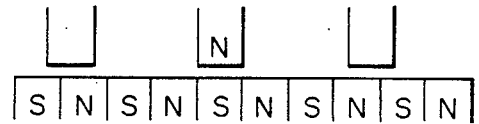
Figure 4F:
Figure 4G:
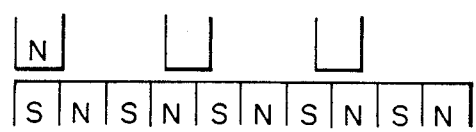

FIG. 3 shows a relationship between stator magnetic poles and their windings and rotor teeth in the case of n=3 in equation (3). (also shown in FIG. 8A) Here, Z=24, and 9-pole stator, and the number of teeth on the extreme end of each of the 9 poles is not restricted in particular if the number is equal for each pole. Windings are shown for I-phase and II-phase, and III-phase is omitted. Supposing that K=(PZ)/m, it is an integer in case of 3-phase in the present invention. When K is an integer, stator magnetic poles in each phase are magnetized to become the same polarity, and stator magnetic poles in one phase which are excited in the next place are magnetized to become the opposite polarity with respect to the preceding phase. In the case of FIG. 3, K=(3×24)/9=8. As a means for achieving such magnetization, the direction of current may be reversed, or the winding direction of a coil may be reversed. The rotor teeth of two rotor plates sandwiching a permanent magnet are displaced relative to each other by ½ pitch when viewed in the direction a rotary shaft. The teeth of the rear rotor plate behind the permanent magnet are shown in FIG. 3 by hatching.

FIGS. 4A to 4G illustrates the principles of rotation of the rotor which is driven by one-phase excitation in the case where the stator magnetic poles of I-phase, II-phase, and III-phase and the rotor teeth are in a relation as shown in FIG. 3. Since the rotor teeth of the two rotor plates interposed by the permanent magnet therebetween are displaced relative to each other so that N-pole and S-pole are displaced by ½ pitch, this positional relationship is shown as in FIG. 4. A condition shown in FIG. 4A corresponds to the positional relation between the stator and the rotor in FIG. 3.

Figures 5, 6:
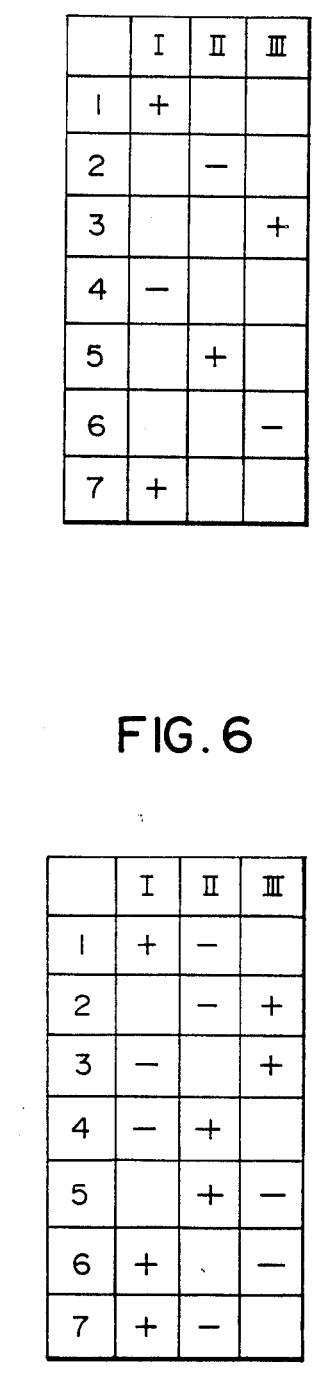

FIG. 5 is a table showing a manner of supplying current for driving by one-phase excitation in the windings of I-phase, II-phase, and III-phase, and a direction of the current. A direction of current flowing from $I_A$ to $I_B$, a direction of current flowing from $II_A$ to $II_B$, and a direction of current flowing from $III_A$ to $III_B$ in FIG. 3 are represented by a sign of +, and their opposite directions are represented by a sign of −. It will be understood that when a current in FIG. 5 flows in the order of 1, 2, . . . , 6, and 7, the rotor moves as shown in FIGS. 4A to 4G, in the order of FIGS. 4A, 4B, . . . 4F, and 4G with a step of 1/6 of the pitch of the rotor teeth number Z. FIG. 6 shows an excitation current sequence in the case of driving by 2-phase excitation.

Next, the reason why the above-mentioned equations (2) to (5) are applicable to 3-phase hybrid stepping motor will be explained as follows.

Specifically, since P is 3 phases, when substituting P=3 in equation (1), it is obtained that $$\theta_s = 60/Z \tag{10}$$

On the other hand, from FIG. 3 or 4, the stepping angle $\theta_s$ is expressed by $$\theta_s = \pm\{360/9 - 360(n\mp\tfrac{1}{2})/Z\} \tag{11}$$

From equations (10) and (11), the equations (2) and (3) are led.

Similarly, when m=12, it is obtained that $$\theta_s \pm \{360/12 - 360(n\mp\tfrac{1}{2})/Z\} \tag{12}$$

From equations (10) and (12), equations (4) and (5) are led.

Similarly, in the case of 4-phase, P=4 is substituted in equation (1), and the following result is obtained.

$$\theta_s = 45/Z \tag{13}$$

When m=8, $$\theta_s = \pm\{360/8 - 360(n\mp\tfrac{1}{2})/Z\} \tag{14}$$

When m=16, $$\theta_s = \mp \{360/16 - 360(n\frac{1}{2})/Z\} \quad (15)$$

From equations (13) and (14), equations (6) and (7) are led, and from equations (13) and (15), equations (8) and (9) are led.

As a prior art, the case in which 4-phase and m=8 is disclosed in U.S. Pat. No. 4,385,247 and the case in which 4-phase and m=16 is disclosed in U.S. Pat. No. 4,675,564. However, in both the U.S. Patents, the stator magnetic poles do not have uniform and equal pitches, and Z is also different. Hereinbelow it will be explained why the uniform stator magnetic poles are important to improve the step angle accuracy of a stepping motor. The stator is formed by lamination of a silicon steel plate. However, there are variations or non-uniformity in the magnetic orientation of in a hoop material of the steel plate, and the non-uniformity is also exists in the direction of a thickness. For this reason, in order to improve the step angle accuracy, the lamination of the stator is carried out at the present time, by rotating each sheet of steel plate 90 degrees one by one. In an asymmetrical (non-uniform pitch) stator core, it is impossible to perform such a work.

In contrast, in the present invention, since the symmetrical stator core is used, a stepping motor having an excellent step angle can be provided.

Figure 7:
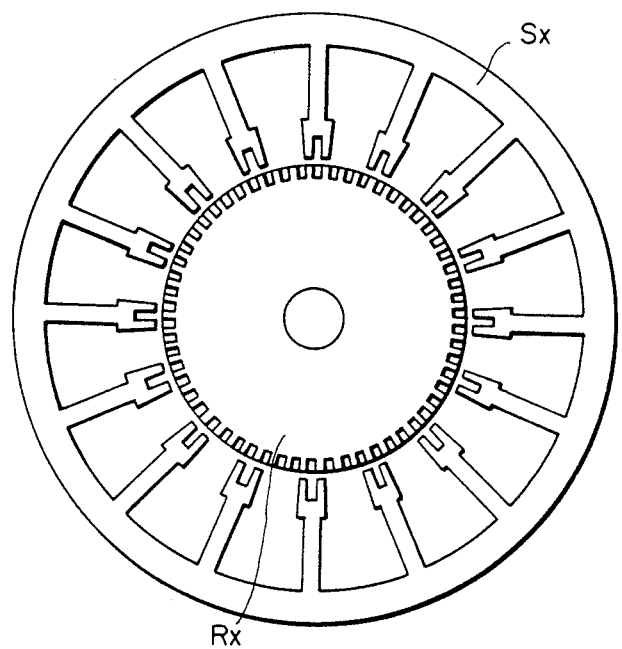
FIG. 7 is a longitudinal sectional view showing an example of a stepping motor according to the present invention wherein a 4-phase stepping motor has 16 stator poles and 58 rotor teeth (only the arrangement of teeth of the stator and a rotor is shown).

FIG. 7 shows a relationship between the teeth of a stator Sx and a rotor Rx in which in equation (9), n=4 and Z=58 (see FIG. 8D). FIG. 8C also shows the case in which 4-phase and 8-poles. In the equation K=(P Z)/m described hereinbefore, K=4×58/16=14.5 is obtained, and there is a fraction of 0.5. In the present invention, in the case of 4-phase, the fraction is always 0.5, and in this case, the polarities of the stator magnetic poles in each phase are such that N-pole and S-pole are alternately disposed. However, it is the characteristic feature in the present invention that among the stator magnetic poles of a phase which are excited in the next place, a stator magnetic pole which is positioned adjacent to a stator magnetic pole of the preceding phase is made to have the opposite polarity to that of the preceding stator magnetic pole. In other wards, in FIG. 1, when the stator magnetic pole 10a is N-pole, the stator magnetic pole 10b is S-pole, the stator magnetic pole 10c which is excited in the next place is made N-pole. Accordingly, this is driven in a similar manner to the case of 3-phase in FIGS. 4 and 5, and the illustration in a drawing is omitted.

A hybrid-type stepping motor in the present invention, as described in the foregoing, comprises a rotor including disc-like magnetic poles each having many pole teeth in the outer periphery, and including a permanent magnet magnetized in the axial direction to form 2 poles and having opposite ends respectively abutting against the disc-like magnetic poles thereby to constitute the hybrid-type stepping motor, and the number of pole teeth, Z, of the rotor and a step angle are designed to satisfy particular conditions. As a result, the following advantageous effects are obtained:

(1) Without providing a great number of pole teeth of the rotor, a step angle which becomes minute can be obtained as compared with a 2-phase stepping motor.

(2) Since, the stator is of a complete symmetrical shape of equal pitch, it is permitted to perform rotation lamination. As a result, it is possible to provide a stepping motor having a good step angle accuracy and a practical minute step angle.

(3) In the 3-phase stepping motors, a VR type which does not use a permanent magnet is the main current. However, since the stepping motor according to the present invention is of a hybrid type, a large torque is obtained with small current, and a detent torque is also obtained even with no excitation.

(4) While the foregoing description is made as to the so-called inner rotor type in which the rotor rotates inside the stator, the present invention is also applicable to the so-called outer rotor type in which the rotor rotates outside the stator. In the outer rotor type, although the inertia of rotation is increased, it is advantageous in a field of application for constant rotation. For example, when it is used for driving a drum of a laser beam printer, the non-uniformity in rotational speed is small.

What is claimed is:

1. An inner rotor hybrid type stepping motor, wherein a rotor includes two rotary plates having a multiplicity of gear-like salient poles, and includes a permanent magnet sandwiched between the rotary plates and magnetized in the same direction as a rotary shaft, the gear-like salient poles of the two rotary plates being disposed with a half pitch displaced relative to each other, and wherein m stator magnetic poles are disposed opposing a rotor surface with an air gap interposed therebetween and radially at equal pitches over 360 degrees, each of portions of the stator magnetic poles opposing the rotor has a plurality of teeth the same in number and having a pitch substantially equal to a rotor tooth pitch, and each main pole is wound with a winding, the improvement in which when the number of the gear-like salient poles of the rotor is represented by z, and n is an integer equal to or larger than 1 ($n \geq 1$), and magnetic polarities of adjacent stator magnetic poles are opposite polarities to each other by switching phase excitation, the following relationships are satisfied:

$m=9$, and the stator is a 3-phase winding stator, it is set that $z=9n\pm 3$.

2. An inner rotor hybrid type stepping motor, wherein a rotor includes two rotary plates having a multiplicity of gear-like salient poles, and includes a permanent magnet sandwiched between the rotary plates and magnetized in the same direction as a rotary shaft, the gear-like salient poles of the two rotary plates being disposed with a half pitch displaced relative to each other, and wherein m stator magnetic poles are disposed opposing a rotor surface with an air gap interposed therebetween and radially at equal pitches over 360 degrees, each of portions of the stator magnetic poles opposing the rotor has a plurality of teeth the same in number and having a pitch substantially equal to a rotor tooth pitch, and each main pole is wound with a winding, the improvement in which when the number of the gear-like salient poles of the rotor is represented by z, and n is an integer equal to or larger than 1 ($n \geq 1$), and magnetic polarities of adjacent stator magnetic poles are opposite polarities to each other by switching phase excitation, the following relationships are satisfied:

$m=12$, and the stator is a 3-phase winding stator it is set that $z=12n\pm 4$.

3. An inner rotor hybrid type stepping motor, wherein a rotor includes two rotary plates having a multiplicity of gear-like salient poles, and includes a permanent magnet sandwiched between the rotary plates and magnetized in the same direction as a rotary shaft, the gear-like salient poles of the two rotary plates being disposed with a half pitch displaced relative to each other, and wherein m stator magnetic poles are disposed opposing a rotor surface with an air gap interposed therebetween and radially at equal pitches over 360 degrees, each of portions of the stator magnetic poles opposing the rotor has a plurality of teeth the same in number and having a pitch substantially equal to a rotor tooth pitch, and each main pole is wound with a winding, the improvement in which when the number of the gear-like salient poles of the rotor is represented by z, and n is an integer equal to or larger than 1 ($n \geq 1$), and magnetic polarities of adjacent stator magnetic poles are opposite polarities to each other by switching phase excitation, the following relationships are satisfied:

$m=8$, and the stator is a 4-phase winding stator it is set that $z=8n\pm3$.

4. An inner rotor hybrid type stepping motor, wherein a rotor includes two rotary plates having a multiplicity of gear-like salient poles, and includes a permanent magnet sandwiched between the rotary plates and magnetized in the same direction as a rotary shaft, the gear-like salient poles of the two rotary plates being disposed with a half pitch displaced relative to each other, and wherein m stator magnetic poles are disposed opposing a rotor surface with an air gap interposed therebetween and radially at equal pitches over 360 degrees, each of portions of the stator magnetic poles opposing the rotor has a plurality of teeth the same in number and having a pitch substantially equal to a rotor tooth pitch, and each main pole is wound with a winding, the improvement in which when the number of the gear-like salient poles of the rotor is represented by z, and n is an integer equal to or larger than 1 ($n \geq 1$), and magnetic polarities of adjacent stator magnetic poles are opposite polarities to each other by switching phase excitation, the following relationships are satisfied:

$m=16$, and the stator is a 4-phase winding stator it is set that $z=16n\pm6$.

5. An outer rotor hybrid type stepping motor, wherein a rotor includes two rotary plates having a multiplicity of gear-like salient poles, and includes a permanent magnet sandwiched between the rotary plates and magnetized in the same direction as a rotary shaft, the gear-like salient poles of the two rotary plates being disposed with a half pitch displaced relative to each other, and wherein m stator magnetic poles are disposed opposing a rotor surface with an air gap interposed therebetween and radially at equal pitches over 360 degrees, each of portions of the stator magnetic poles opposing the rotor has a plurality of teeth the same in number and having a pitch substantially equal to a rotor tooth pitch, and each main pole is wound with a winding, the improvement in which when the number of the gear-like salient poles of the rotor is represented by z, and n is an integer equal to or larger than 1 ($n \geq 1$), and magnetic polarities of adjacent stator magnetic poles are opposite polarities to each other by switching phase excitation, the following relationships are satisfied:

$m=9$, and the stator is a 3-phase winding stator, it is set that $z=9n\pm3$.

6. An outer rotor hybrid type stepping motor, wherein a rotor includes two rotary plates having a multiplicity of gear-like salient poles, and includes a permanent magnet sandwiched between the rotary plates and magnetized in the same direction as a rotary shaft, the gear-like salient poles of the two rotary plates being disposed with a half pitch displaced relative to each other, and wherein m stator magnetic poles are disposed opposing a rotor surface with an air gap interposed therebetween and radially at equal pitches over 360 degrees, each of portions of the stator magnetic poles opposing the rotor has a plurality of teeth the same in number and having a pitch substantially equal to a rotor tooth pitch, and each main pole is wound with a winding, the improvement in which when the number of the gear-like salient poles of the rotor is represented by z, and n is an integer equal to or larger than 1 ($n \geq 1$), and magnetic polarities of adjacent stator magnetic poles are opposite polarities to each other by switching phase excitation, the following relationships are satisfied:

$m=12$, and the stator is a 3-phase winding stator it is set that $z=12n\pm4$.

7. An outer rotor hybrid type stepping motor, wherein a rotor includes two rotary plates having a multiplicity of gear-like salient poles, and includes a permanent magnet sandwiched between the rotary plates and magnetized in the same direction as a rotary shaft, the gear-like salient poles of the two rotary plates being disposed with a half pitch displaced relative to each other, and wherein m stator magnetic poles are disposed opposing a rotor surface with an air gap interposed therebetween and radially at equal pitches over 360 degrees, each of portions of the stator magnetic poles opposing the rotor has a plurality of teeth the same in number and having a pitch substantially equal to a rotor tooth pitch, and each main pole is wound with a winding, the improvement in which when the number of the gear-like salient poles of the rotor is represented by z, and n is an integer equal to or larger than 1 ($n \geq 1$), and magnetic polarities of adjacent stator magnetic poles are opposite polarities to each other by switching phase excitation, the following relationships are satisfied:

$m=8$, and the stator is a 4-phase winding stator it is set that $z=8n\pm3$.

8. An outer rotor hybrid type stepping motor, wherein a rotor includes two rotary plates having a multiplicity of gear-like salient poles, and includes a permanent magnet sandwiched between the rotary plates and magnetized in the same direction as a rotary shaft, the gear-like salient poles of the two rotary plates being disposed with a half pitch displaced relative to each other, and wherein m stator magnetic poles are disposed opposing a rotor surface with an air gap interposed therebetween and radially at equal pitches over 360 degrees, each of portions of the stator magnetic poles opposing the rotor has a plurality of teeth the same in number and having a pitch substantially equal to a rotor tooth pitch, and each main pole is wound with a winding, the improvement in which when the number of the gear-like salient poles of the rotor is represented by z, and n is an integer equal to or larger than 1 ($n \geq 1$), and magnetic polarities of adjacent stator magnetic poles are opposite polarities to each other by switching phase excitation, the following relationships are satisfied:

$m=16$, and the stator is a 4-phase winding stator it is set that $z=16n\pm6$.

* * * * *